(12) United States Patent
Wei (10) Patent No.: US 9,057,469 B2
(45) Date of Patent: Jun. 16, 2015

(54) QUICK CONNECTOR

(71) Applicant: Chung-Chih Wei, Taichung (TW)

(72) Inventor: Chung-Chih Wei, Taichung (TW)

(*) Notice: Subject to any disclaimer, the term of this patent is extended or adjusted under 35 U.S.C. 154(b) by 92 days.

(21) Appl. No.: 14/025,744

(22) Filed: Sep. 12, 2013

(65) Prior Publication Data

US 2014/0083543 A1 Mar. 27, 2014

(30) Foreign Application Priority Data

Sep. 25, 2012 (TW) .............................. 101135038 A (51) Int. Cl.
*F16K 11/07* (2006.01)
*F16L 37/46* (2006.01)
*F16L 37/23* (2006.01)

(52) U.S. Cl.
CPC ................. *F16L 37/46* (2013.01); *F16K 11/07* (2013.01); *F16L 37/23* (2013.01)

(58) Field of Classification Search
CPC ........... F16K 11/07; F16L 37/23; F16L 37/46
USPC ........................................ 137/878; 251/149.9
See application file for complete search history.

(56) References Cited

U.S. PATENT DOCUMENTS

| 3,554,230 | A | * | 1/1971 | Berg et al. | 137/614.04 |
|---|---|---|---|---|---|
| 4,496,079 | A | * | 1/1985 | Verley | 222/129.1 |
| 6,736,367 | B2 | * | 5/2004 | Scobie | 251/149.9 |
| 7,153,296 | B2 | * | 12/2006 | Mitchell | 604/533 |
| 7,549,445 | B2 | * | 6/2009 | Mikiya et al. | 137/625.22 |
| 7,669,612 | B2 | * | 3/2010 | Matsumoto | 137/614.06 |
| 8,616,524 | B2 | * | 12/2013 | Tiberghien et al. | 251/186 |
| 8,632,052 | B2 | * | 1/2014 | Liu | 251/149.9 |
| 8,887,762 | B2 | * | 11/2014 | Densel et al. | 137/614.06 |

* cited by examiner

*Primary Examiner* — John Fox (57) ABSTRACT

A quick connector contains a body, an air inlet seat, a piston pushing device, a fitting device, and a driving device. The body includes an outer screwing section, an upper chamber, a lower chamber, a first air inlet, an air outlet, a connecting tube, an oil seal, and a first fixing orifice. The air inlet seat includes a first end coupling with an air supply pipe and includes a second end screwing with the body. The piston pushing device includes a head member and a piston rod, and the head member has a venting orifice, the piston rod includes a valve. The fitting device includes a flange spacer ring, a resilient element, a gasket, and a positioning loop, the flange spacer ring includes an abutting face. The driving device includes a controlling member with a second fixing orifice, an opening, an elastic element, a shaft, and a stopping block.

6 Claims, 7 Drawing Sheets

FIG. 8

QUICK CONNECTOR

FIELD OF THE INVENTION

The present invention relates to a quick connector which connects with and disconnects from a male joint and an air supply pipe quickly.

BACKGROUND OF THE INVENTION

A conventional connector is disclosed in TW Patent No. 425968 and contains a body, a holder, a valve seat, and a housing. The body includes an inlet chamber, a retaining groove, and a screwing slot. The retaining groove has a seal ring and a press loop for contacting with the seal ring, the holder is screwed with the body and has an outlet chamber, a returning spring, a plurality of orifices and plural balls. The valve seat is fixed between the body and the holder and has at least one inlet, and the housing is fitted between the body and the holder and has a spring trench, a limiting recess, and a pushing spring. However, such a conventional connector cannot connect or remove a male joint and a female joint quickly and smoothly because of high pressure in an air supply pipe.

The present invention has arisen to mitigate and/or obviate the afore-described disadvantages.

SUMMARY OF THE INVENTION

The primary object of the present invention is to provide a quick connector which connects with and disconnects from a male joint and an air supply pipe quickly.

To obtain the above objective, a quick connector provided by the present invention contains: a body, an air inlet seat, a piston pushing device, a fitting device, and a driving device.

The body includes an outer screwing section, an upper chamber, a lower chamber, a first air inlet, an air outlet, a connecting tube, an oil seal, and a first fixing orifice. The body includes the upper chamber defined at an appropriate position thereof and the lower chamber communicating with the upper chamber, the connecting tube extends outwardly from a second end of the body opposite to a first end of the body on which the outer screwing section is formed, and the connecting tube has an accommodating cavity defined therein.

The air inlet seat includes a first end coupling with one end of an air supply pipe and a second end screwing with the body.

The piston pushing device includes a head member and a piston rod, and the head member has a venting orifice defined on a central position thereof so as to insert the piston rod. The piston rod includes a valve disposed on a lower end thereof.

The fitting device includes a flange spacer ring, a resilient element, a gasket, and a positioning loop. The flange spacer ring includes an abutting face, and the resilient element is disposed on the flange spacer ring and is connected with the gasket, the positioning loop is retained in a locking slot of the connecting tube.

The driving device includes a controlling member, an opening, an elastic element, a shaft, and a stopping block. The controlling member has a second fixing orifice formed therein and corresponding to the first fixing orifice of the body, the shaft is used for fixing the controlling member and the elastic element on the body. The controlling member has a stop face formed on one end thereof and contacting with a forcing face of the piston rod, the stopping block is fixed between the body and the fitting device.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

With reference to FIGS. 1-8, a quick connector 100 according to a first embodiment of the present invention comprises: a body 10, an air inlet seat 20, a piston pushing device 30, a fitting device 40, and a driving device 50.

Figure 1:
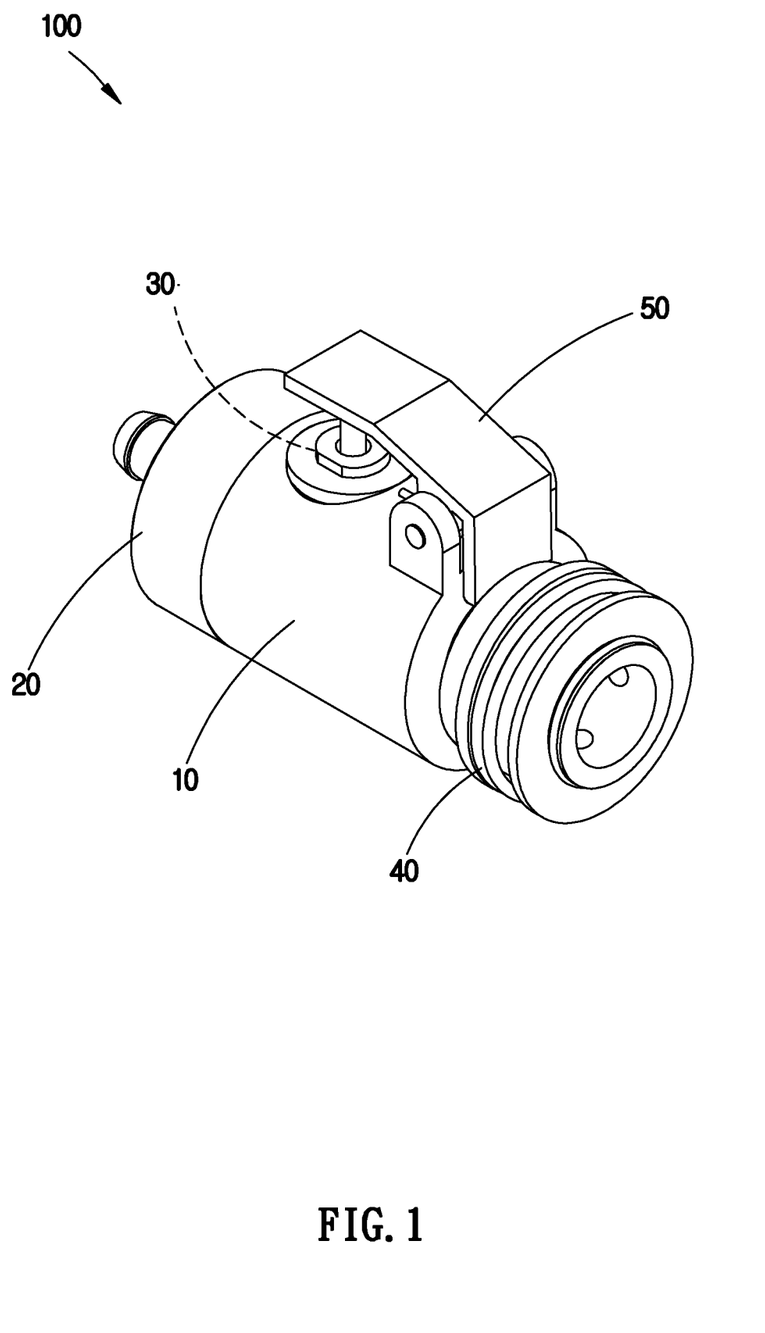
FIG. 1 is a perspective view showing the assembly of a quick connector according to a first embodiment of the present invention.
Figure 2:
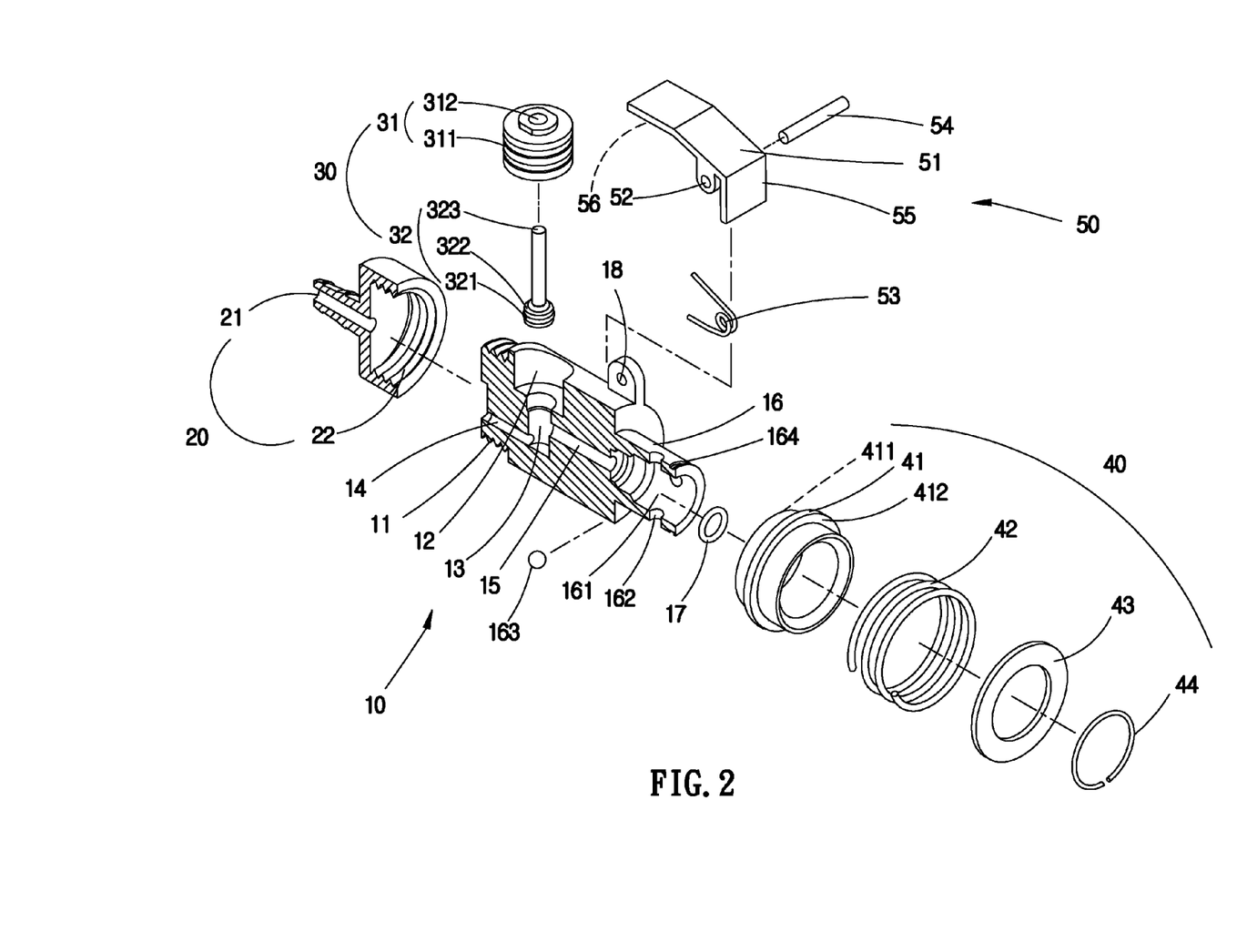
FIG. 2 is a perspective view showing the exploded components of the quick connector according to the first embodiment of the present invention.
Figure 3:
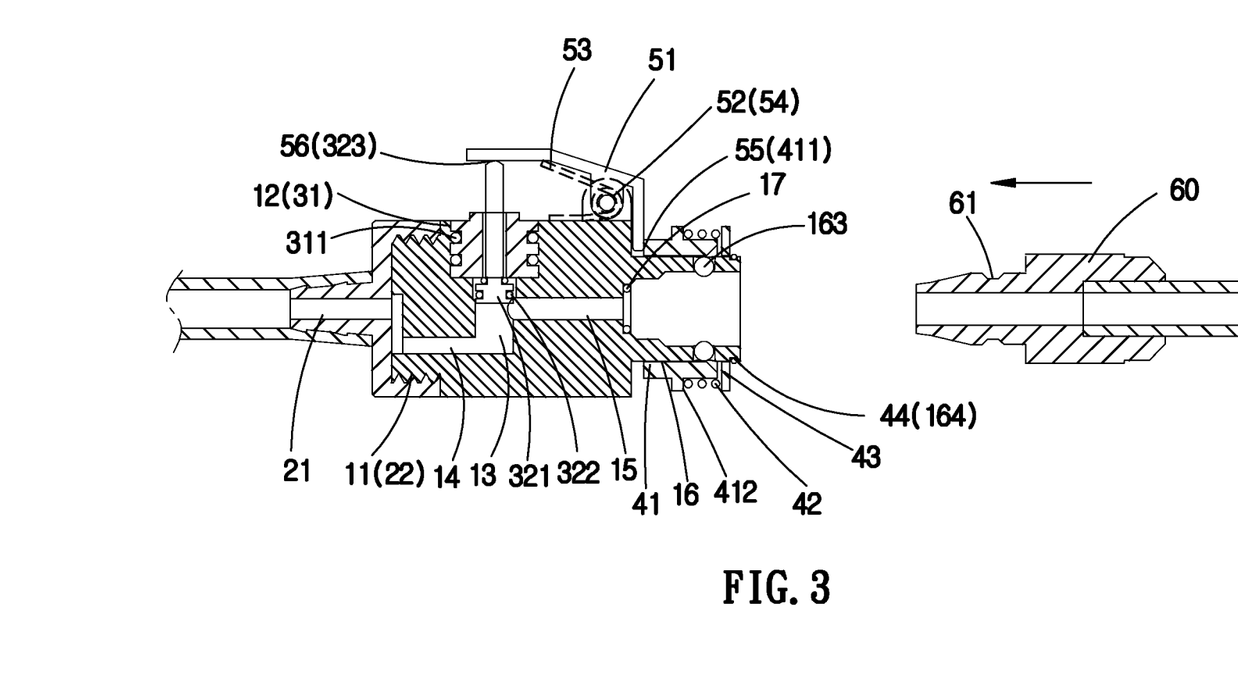
FIG. 3 is a cross sectional view showing before the quick connector connecting with a male joint according to the first embodiment of the present invention.

As shown in FIGS. 1 and 2, the body 10 includes an outer screwing section 11, an upper chamber 12, a lower chamber 13, a first air inlet 14, an air outlet 15, a connecting tube 16, an oil seal 17, and a first fixing orifice 18. The body 10 includes the air inlet seat 20 disposed on a first end thereof, and the air inlet seat 20 has a first inner screwing section 22 formed around an inner wall thereof so as to screw with the outer screwing section 11 on the first end of the body 10. The body 10 includes the upper chamber 12 defined at an appropriate position thereof and the lower chamber 13 communicating with the upper chamber 13, wherein the upper chamber 12 is larger than the lower chamber 13, such that the piston pushing device 30 is received in the upper chamber 12 and the lower chamber 13. The first air inlet 14 is arranged in the first end of the body 10 and communicating with the air outlet 15 in a second end of the body 10 via the lower chamber 13, such that air flows into the first air inlet 14 and the air outlet 15; wherein the first air inlet 14 and the air outlet 15 are not on the same axis of the body 10. The connecting tube 16 extends outwardly from the second end of the body 10 and has an accommodating cavity 161 defined therein so as to receive a male joint 60 and the oil seal 17. The connecting tube 16 also has a plurality of holes 162 arranged around an externally peripheral wall thereof so as to receive plural balls 163, wherein a profile of each hole 162 is conical so that each ball 163 does not fall into the accommodating cavity 161. The connecting tube 16 also has a locking slot 164 formed around the externally peripheral wall thereof so as to fit with the fitting device 40. The first fixing orifice 18 is defined on a tab of the body 10 and corresponds to an aperture 52 of the driving device 50 so that the driving device 50 is connected with the body 10.

Referring further to FIGS. 1 and 2, the air inlet seat 20 includes a second air inlet 21 formed on a first end thereof so as to couple with one end of an air supply pipe (not shown) and a second inner screwing section 22 arranged on a second end thereof so as to screw with the outer screwing section 11 of the body 10.

As illustrated in FIGS. 1 to 4, the piston pushing device 30 includes a head member 31 and a piston rod 32, and the head member 31 has at least one first leak-proof ring 311 retained around an outer peripheral wall thereof, such that when the head member 31 is secured in the upper chamber 12 of the body 10, the at least one first leak-proof ring 311 prevents air from leakage. The head member 31 also has a venting orifice 312 defined on a central position thereof so as to insert the piston rod 32, and the piston rod 32 has a first end extending out of the head member 31 and a forcing face 323 arranged on a top end thereof so as to contact with the driving device 50, wherein the piston rod 32 has a diameter smaller than a diameter of the venting orifice 312, and between the piston rod 32 and the venting orifice 312 is defined a gap for flowing the air from the body 10. The piston rod 32 also includes a valve 321 disposed on a lower end thereof and placed in the lower chamber 13 and includes at least one second leak-proof ring 322 fitted on the valve 321 and mounted in the lower chamber 13, such that the driving device 50 drives the piston rod 32 to move upwardly and downwardly so that the valve 321 opens or closes the lower chamber 13, thus flowing or stopping flowing the air. When the valve 321 is forced by an external force to move downwardly, it stops the air from the first air inlet 14, and then an air pressure in the air outlet 15 becomes small, because the gap is defined between the piston rod 32 and the venting orifice 312, the air in the air outlet 15 and the air supply pipe (not shown) exhausts from the venting orifice 312, hence there is no any pressure existing in the air outlet 15 and the air supply pipe.

With reference to FIGS. 1 to 4, the fitting device 40 is fitted on the connecting tube 16 of the body 10 and includes a flange spacer ring 41, a resilient element 42, a gasket 43, and a positioning loop 44. The flange spacer ring 41 is mounted on the second end of the body 10 and has an abutting face 411 for abutting against a stopping block 55 of the driving device 50, and the resilient element 42 is disposed on a locating face 412 of the flange spacer ring 41 and is connected with the gasket 43. The positioning loop 44 is retained in the locking slot 164 of the connecting tube 16 so that the fitting device 40 is fixed on the connecting tube 16.

Figure 4:
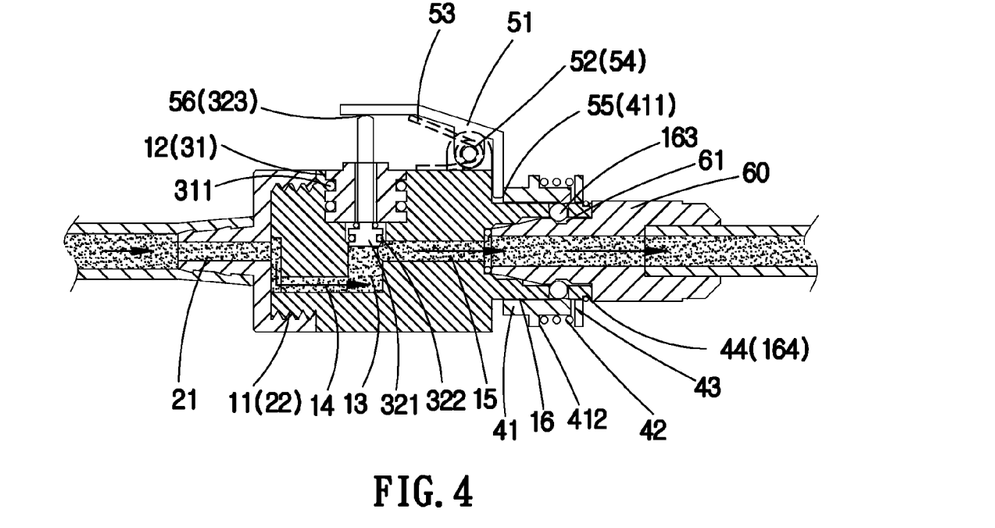
FIG. 4 is a cross sectional view showing the operation of the quick connector according to the first embodiment of the present invention.

As shown in FIGS. 1 to 4, the driving device 50 includes a controlling member 51, an opening 52, an elastic element 53, a shaft 54, and the stopping block 55. The controlling member 51 has a second fixing orifice 52 formed therein and corresponding to the first fixing orifice 18 of the body 10, the elastic element 53 secured in the second fixing orifice 52, and the shaft 54 for fixing the controlling member 51 and the elastic element 53 on the body 10, such that the controlling member 51 swings along the shaft 54 and is pushed by the elastic member 53 to move back to an original position. A stop face 56 is formed on one end of the controlling member 51 and contacts with the forcing face 323 of the piston rod 32, such that when the controlling member 51 is pressed, it drives the piston rod 32 to move downwardly, and the valve 321 closes the first air inlet 14 so that the air from the first air inlet 14 is stopped by the valve 321. The stopping block 55 is fixed between the body 10 and the fitting device 40 so that the stopping block 55 abuts against the abutting face 411 of the flange spacer ring 41, and the locating face 412 of the flange spacer ring 41 presses the resilient element 42 so as to drive the plural balls 163 to retain in a groove 61 of the male joint 60, hence the male joint 60 is locked in the accommodating cavity 161 of the connecting tube 16 and is biased against the oil seal 17, and the body 10 communicates with the male joint 60 as shown in FIG. 4, such that the oil seal 17 prevents the air from leakage. The controlling member 51 swings along the shaft 54, so when the controlling member 51 is pressed, the stopping block 55 is driven by the controlling member 55 to disengage from the body 10 and the abutting face 411 of the flange spacer ring 41 so that the resilient element 42 of the fitting device 40 releases the flange spacer ring 41 to move backwardly, and then the plural balls 163 disengage from the plurality of holes 162, thus removing the male joint 60 easily.

Figure 5:
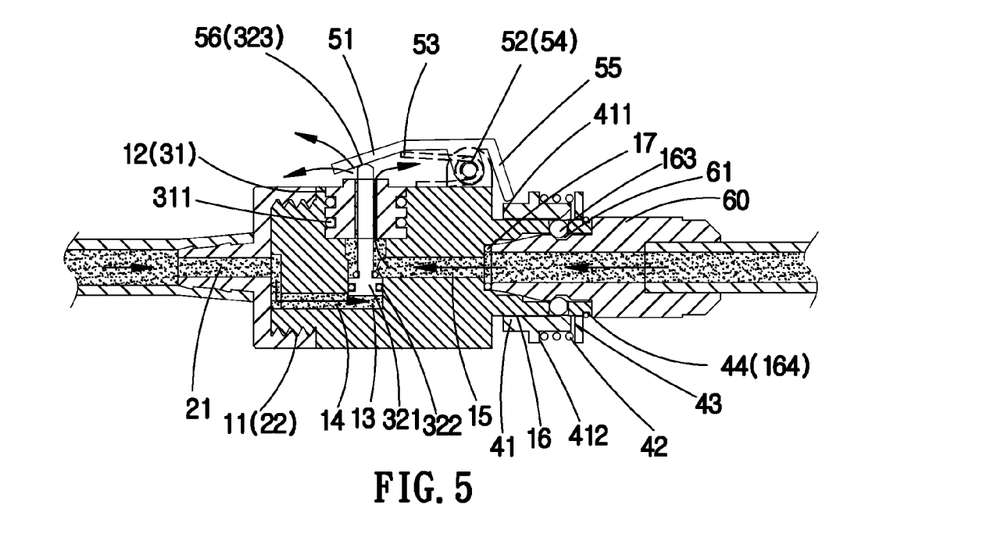
FIG. 5 is another cross sectional view showing the operation of the quick connector according to the first embodiment of the present invention.
Figure 6:
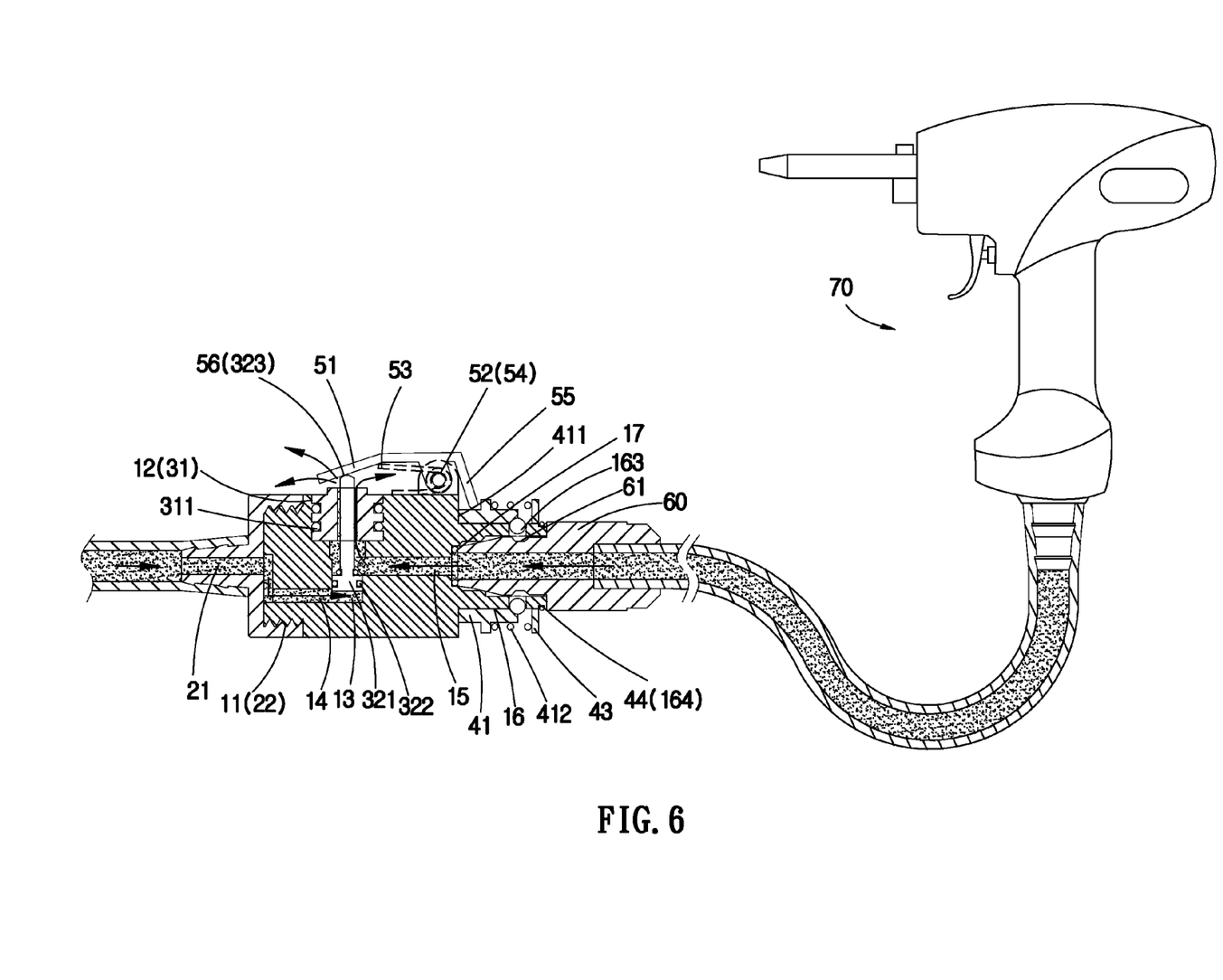
FIG. 6 is also another cross sectional view showing the operation of the quick connector according to the first embodiment of the present invention.

With reference to FIGS. 3 to 6, when the controlling member 51 is presses to drive the piston rod 32 to move downwardly, the valve 321 of the piston rod 32 moves downwardly to close the first air inlet 14, thus stopping the air from the first air inlet 14 as illustrated in FIG. 5. Since between the piston rod 32 and the venting orifice 312 is defined the gap, air in a tool 70 flows out of the gap as shown in FIG. 6, such that when the air in the tool 70 is released suddenly, the male joint 60 does not pop and make noise as being removed. In addition, the controlling member 51 swings along the shaft 54 so as to drive the stopping block 55 to disengage from the body 10 and the flange spacer ring 41 (as illustrated in FIG. 5), hence the resilient element 42 of the fitting device 40 releases the flange spacer ring 41 (as shown in FIG. 6) to move backwardly, and then the plural balls 163 disengage from the plurality of holes 162, thus removing the male joint 60 easily. As desiring to insert the male joint 60 in the body 10, the controlling member 51 is pressed to stop air pressure so as to insert the male joint, such that the plural balls 163 are driven to retain in the groove 61 of the male joint 60. After releasing the controlling member 51, the elastic member 53 moves back to the original position so that the stopping block 55 is driven by the elastic member 53 to insert between the body 10 and the fitting device 40, and since the controlling member 51 moves back to an original position, the air is full of the first air inlet 14 so as to force the piston rod 32 to move upwardly, and then the air flows into the male joint 60, thereby supplying the air in the tool 70.

Figure 7:
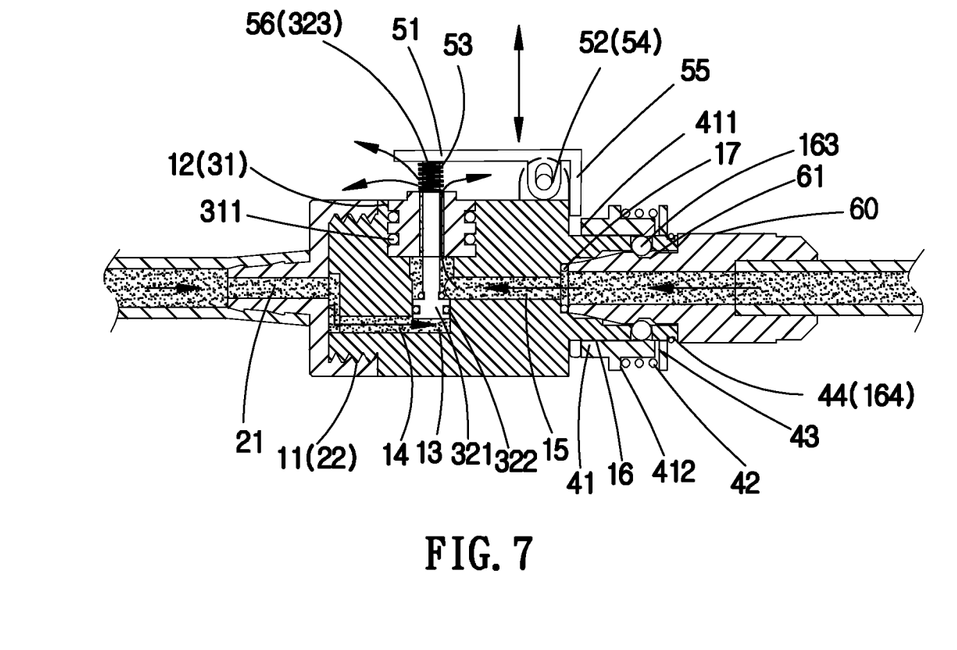
FIG. 7 is a cross sectional view showing the operation of a quick connector according to a second embodiment of the present invention.
Figure 8:
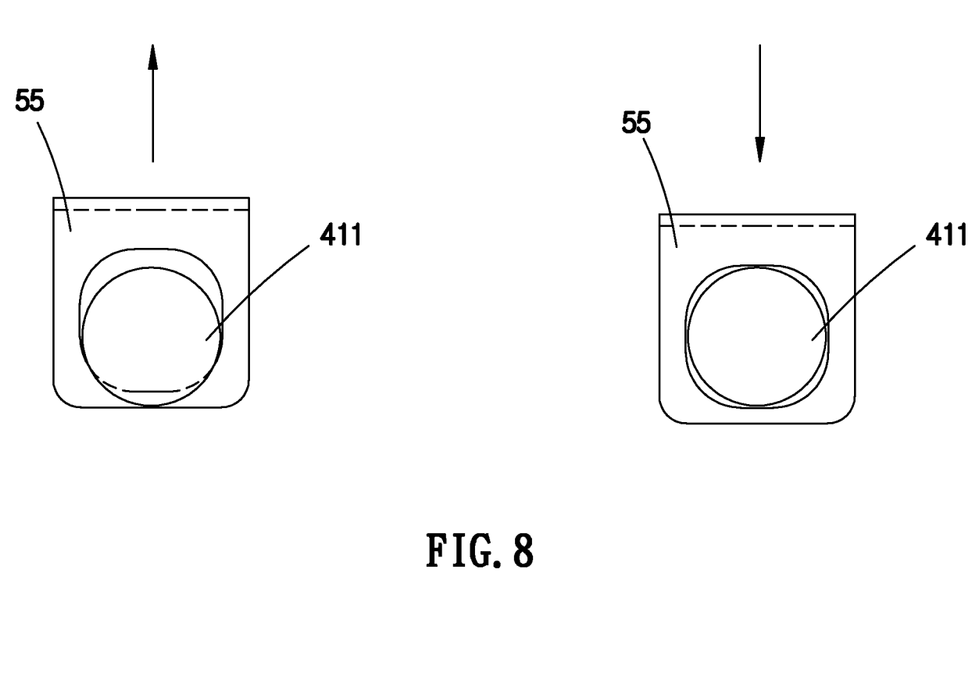
FIG. 8 is a plan view showing the operation of the quick connector according to a second embodiment of the present invention.

In the first embodiment, the driving device 50 is fixed on the body 10 by the shaft 54. However, in a second embodiment, a driving device 50 moves vertically and straightly so that a stopping block 55 is biased against an abutting face 411, thus fixing the driving device 50 on the body 10 as shown in FIGS. 7 and 8.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:
1. A quick connector comprising:
a body, an air inlet seat, a piston pushing device, a fitting device, and a driving device; wherein
the body includes an outer screwing section, an upper chamber, a lower chamber, a first air inlet, an air outlet, a connecting tube, an oil seal, and a first fixing orifice, the body includes the upper chamber defined at an appropriate position thereof and the lower chamber communicating with the upper chamber, the connecting tube extends outwardly from a second end of the body opposite to a first end of the body on which the outer screwing section is formed, and the connecting tube has an accommodating cavity defined therein;

the air inlet seat includes a first end coupling with one end of an air supply pipe and a second end screwing with the body;

the piston pushing device includes a head member and a piston rod, and the head member has a venting orifice defined on a central position thereof so as to insert the piston rod, the piston rod includes a valve disposed on a lower end thereof;

the fitting device includes a flange spacer ring, a resilient element, a gasket, and a positioning loop, the flange spacer ring includes an abutting face, and the resilient element is disposed on the flange spacer ring and is connected with the gasket, the positioning loop is retained in a locking slot of the connecting tube;

the driving device includes a controlling member, an opening, an elastic element, a shaft, and a stopping block, the controlling member has a second fixing orifice formed therein and corresponding to the first fixing orifice of the body, the shaft is used for fixing the controlling member and the elastic element on the body, the controlling member has a stop face formed on one end thereof and contacting with a forcing face of the piston rod, the stopping block is fixed between the body and the fitting device.

2. The quick connector as claimed in claim 1, wherein the upper chamber is larger than the lower chamber, such that the piston pushing device is received in the upper chamber and the lower chamber, the first air inlet is arranged in the first end of the body and communicating with the air outlet in a second end of the body via the lower chamber, wherein the first air inlet and the air outlet are not on the same axis of the body.

3. The quick connector as claimed in claim 1, wherein the valve is placed in the lower chamber and is used to open or close the lower chamber, such that the air in the air outlet and the air supply pipe exhausts from the venting orifice, hence there is no any pressure existing in the air outlet and the air supply pipe.

4. The quick connector as claimed in claim 1, wherein the connecting tube also has a plurality of holes arranged around an externally peripheral wall thereof and a locking slot formed around the externally peripheral wall thereof so as to fit with the fitting device, the first fixing orifice corresponds to an aperture of the driving device so that the driving device is connected with the body.

5. The quick connector as claimed in claim 1, wherein the piston rod has a diameter smaller than a diameter of the venting orifice, and between the piston rod and the venting orifice is defined a gap for flowing the air from the body.

6. The quick connector as claimed in claim 1, wherein the abutting face abuts against the stopping block of the driving device.

* * * * *